United States Patent Office 2,852,106
Patented Sept. 16, 1958

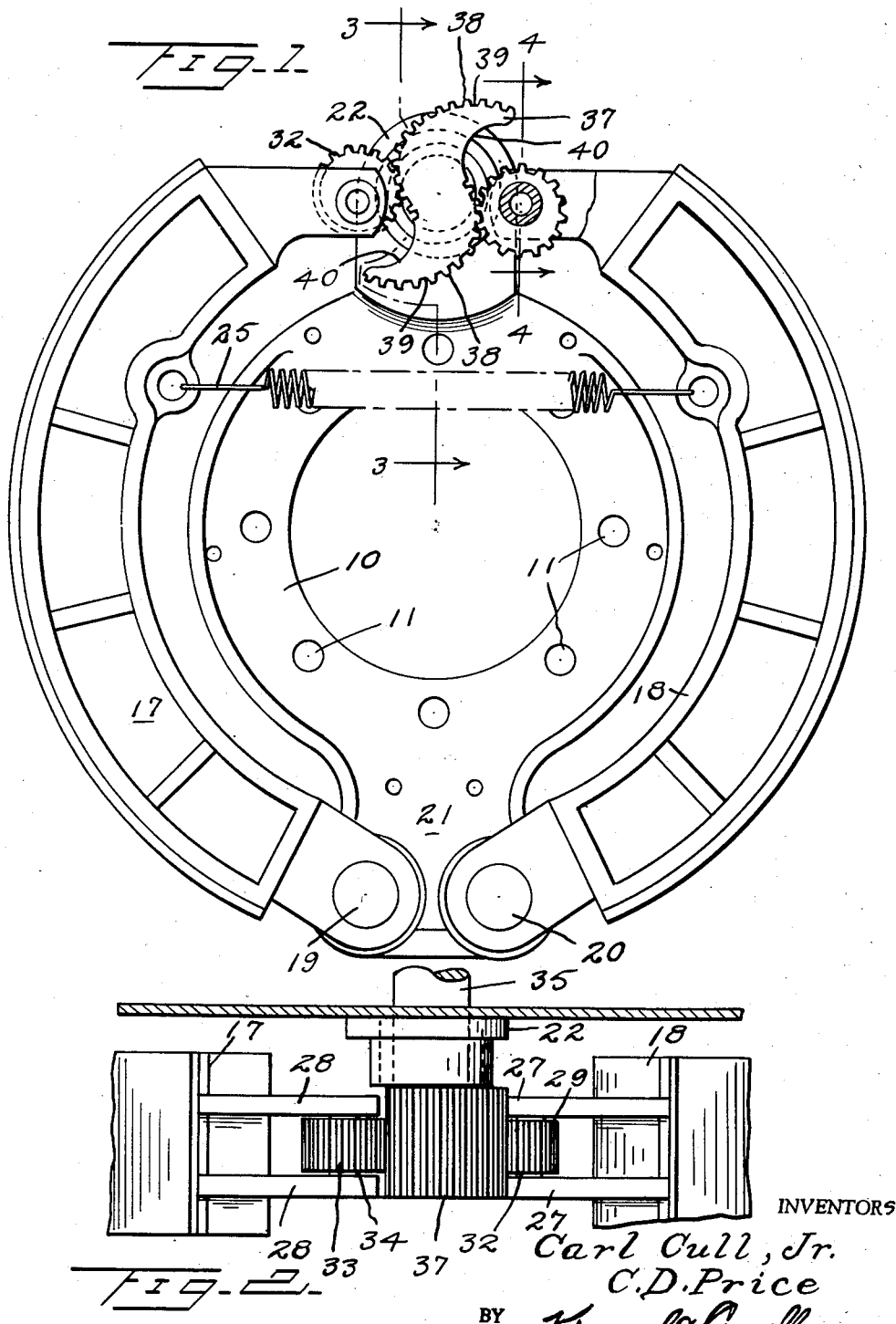

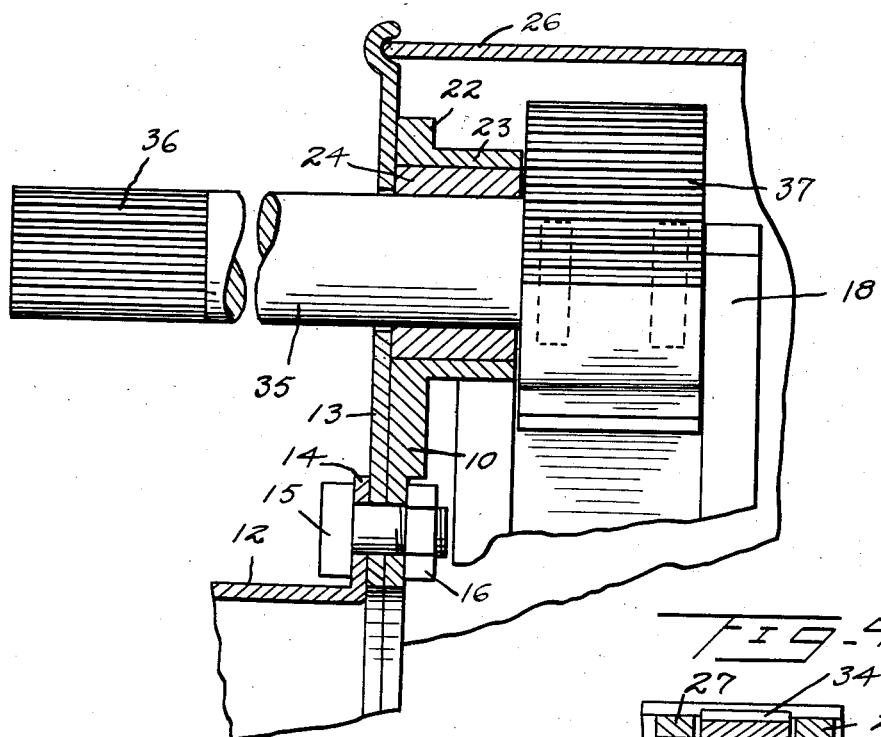
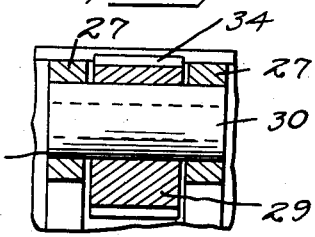
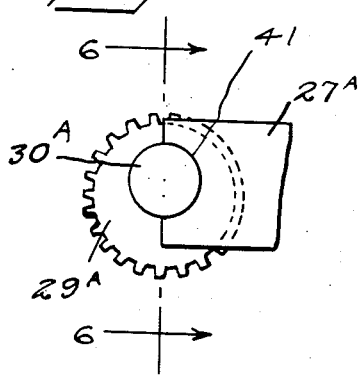
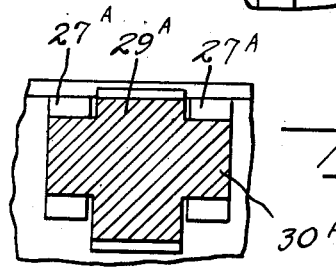

2,852,106

DOUBLE ACTION CAM AND ROLLER BRAKE OPERATOR

Carl Cull, Jr., and Charles D. Price, Flint, Mich.

Application October 10, 1955, Serial No. 539,533

5 Claims. (Cl. 188—78)

The present invention relates to a double action cam and roller brake operator, and more particularly to such devices which are normally operated from a power device.

The primary object of the invention is to provide in a cam and roller brake operator system, a structure for positively connecting the cam and roller whereby slippage of the roller is prevented.

Another object of the invention is to provide in a brake operator of the class described an eccentric roller positively associated with the operating cam in a manner so as to produce a double action operation of the brakes.

A further object of the invention is to provide in a brake mechanism, a brake operator comprising a cam having teeth formed on the cam surface and a cam roller having teeth formed on the surface thereof for engagement with the teeth on the cam surface.

Other objects and advantages will become apparent in the following specification when considered in the light of the attached drawings, in which:

Figure 1 is a front elevation of the invention shown installed;

Figure 2 is a top plan view of the invention;

Figure 3 is an enlarged transverse vertical cross-section taken along the line 3—3 of Figure 1, looking in the direction of the arrows;

Figure 4 is an enlarged detail cross-section of one of the cam rollers taken along the line 4—4 of Figure 1, looking in the direction of the arrows;

Figure 5 is a side elevation of a modified form of roller construction wherein the shaft is formed integrally therewith, and Figure 6 is a fragmentary transverse cross-section taken along line 6—6 of Figure 5, looking in the direction of the arrows.

Referring now to the drawings in detail wherein like reference numerals indicate like parts throughout the several figures, the reference numeral 10 indicates generally a conventional spider of a truck or trailer brake system. The spider 10 is provided with apertures 11 for attachment thereof to the axle housing 12, illustrated in Figure 3.

A dust shield 13 is conventionally mounted between the spider 10 and the flange 14 of the axle housing 12. A bolt 15 extends through the flange 14, the dust shield 13 and the spider 10, and with a nut 16 clamps the aforementioned members together, as illustrated in Figure 3.

It should be understood, of course, that as many bolts 15 are provided as is necessary to support the spider 10 on the axle housing 12. A pair of brake shoes 17 and 18 are pivotally attached by anchor pins 19 and 20 to the lower end portion 21 of the spider 10. The structure of the brake shoes 17 and 18 are conventional as is their mounting to the portion 21 of the spider 10.

The upper end of the spider 10 is provided with an extension 22 which has a transverse opening 23 extending therethrough and supports a bearing 24 therein. The brake shoes 17 and 18 are connected by means of a spring 25 and are normally held away from the brake drum 26. The brake shoes 17 and 18 have roller-carrying forks 27 and 28 formed to extend in facing relation toward each other. The fork 27 has a cam roller 29 journalled in the outer end thereof by means of a pin 30 extending through the roller 29 and the fork 27. The pin 30 is hollow and may be used for lubricating the cam roller 29 in any conventional manner. The cam roller 29 has an eccentric center 31 and is provided with a series of teeth 32 along the outer periphery thereof. An identically formed roller 33 is likewise eccentrically mounted in the outer end of the fork 28 and is provided with teeth 34 in the same manner as the teeth 32 of the roller 29.

A shaft 35 extends through the bearing 24 to a splined end portion 36 which is adapted to be operatively connected to a power brake operating mechanism. The inner end of the shaft 35 is provided with a double curved reversely extending cam 37 which is formed integrally with the shaft 35 and has teeth 38 formed on each cam surface 39 thereof and adapted to engage the teeth 32 and 34 of the rollers 29 and 33. The portions 40 of the cam surfaces 39 are formed without teeth and act as a stop to prevent further turning of the cam 37.

Referring now to Figure 5, a modified form of brake shoe fork 27A is disclosed wherein the roller 29A is provided with an integral shaft 30A extending therethrough and adapted to engage the open arcuate ends 41 of the fork 27A.

In the use and operation of the invention, shaft 35 is rotated through the splines 36 by a power brake operator (not shown) which in turn rotates the cam 37 in a counterclockwise direction, as viewed in Figure 1. Rotation of the cam 37 in this direction causes the cam surfaces 39 to be moved to push the shoes 17 and 18 outwardly. Cam rollers 29 and 33 are journalled in the forks 27 and 28 of the shoes 17 and 18 and engage the cam surfaces 39 of the cam 37. Teeth 32 and 34 are formed on the cam rollers 29 and 33 and engage with teeth 38 formed on the cam surfaces 39 so that rotational movement of the cam 37 on its shaft 35 will positively rotate the cam rollers 29 and 33, moving the larger portion of the rollers 29 and 33 toward the cam 37. Thus it can be seen that the shoes 17 and 18 are not only moved out a distance corresponding to the size of the cam 37, but are further moved a distance corresponding to the size of the cam rollers 29 and 33. This gives a double acting effect multiplying the movement of the brake shoes 17 and 18.

The present construction also permits the brakes to be adjusted to compensate for wear of the brake linings thereof by moving the cam rollers 29 and 33 so that their high points are closer to the high point of the cam 37. In adjusting the brakes of the prior art devices, it has been necessary to replace the rollers with larger rollers to obtain a compensation for the wear of the brake shoes. Obviously in the present invention this has been eliminated.

The use of teeth on the surfaces of the cam wherein the teeth run parallel from the cam and roller is merely by way of illustration and is intended in a generic sense to cover and include, both as described and claimed, parallel, helical, spiral, or herringbone teeth, as these could be used variously under various circumstances, all within the scope of this invention.

Having thus described the preferred embodiments of the invention, it should be understood that numerous modifications and structural adaptations may be resorted to without departing from the scope of the appended claims.

What is claimed is:

1. A double acting cam and roller brake operator comprising; a brake shoe spider, a pair of brake shoes pivotally secured at one end to said spider, a spring normally biasing the other ends of said brake shoes toward each other, a fork formed on each of the other ends of said brake shoe, an eccentric roller pivotally carried on the outer end of each of said forks, teeth formed on the peripheral face of each of said rollers, a shaft journalled in said spider, an S-shaped cam fixed to said shaft and engaged between said eccentric rollers, a pair of oppositely extending arcuate cam faces formed on said cam, teeth formed on said cam faces engaging with the teeth of said rollers whereby rotation of said cam will rotate said rollers and simultaneously move said brake shoes outwardly, and means connected to said shaft for rotating said shaft.

2. A device as claimed in claim 1, wherein said eccentric rollers are carried by pivot pins extending therethrough and through said forks.

3. A device as claimed in claim 1, wherein said eccentric rollers are provided with integral pivot pins extending therefrom.

4. A device as claimed in claim 1, wherein the teeth on said cam surfaces extend parallel to the axis of said cam.

5. A device as claimed in claim 4, wherein the teeth on said eccentric rollers extend parallel to the axis of said rollers.

References Cited in the file of this patent

UNITED STATES PATENTS

| | | |
|---|---|---|
| 1,175,286 | Myers | Mar. 14, 1916 |
| 1,653,948 | Dee | Dec. 27, 1927 |
| 1,680,986 | Harelik | Aug. 14, 1928 |
| 2,592,536 | Buckendale | Apr. 15, 1952 |
| 2,710,076 | Russell | June 7, 1955 |